Figure 1:
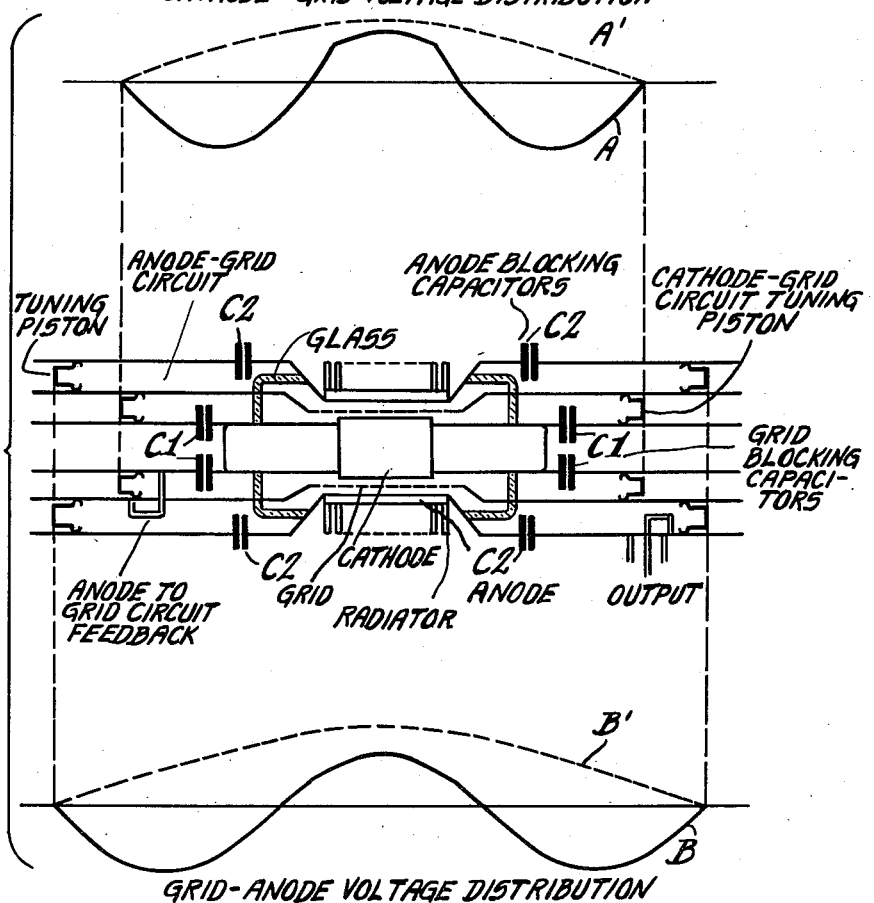

April 8, 1952     L. S. NERGAARD     2,591,963
ELECTRON DISCHARGE DEVICE AND CIRCUIT
Filed June 17, 1948     3 Sheets-Sheet 1

INVENTOR
Leon S. Nergaard
BY
William A. Zalesak
ATTORNEY

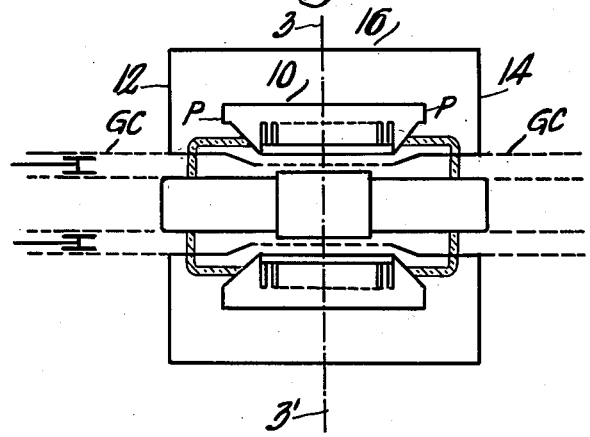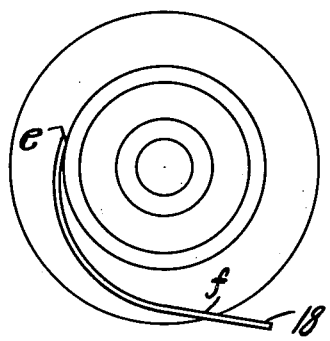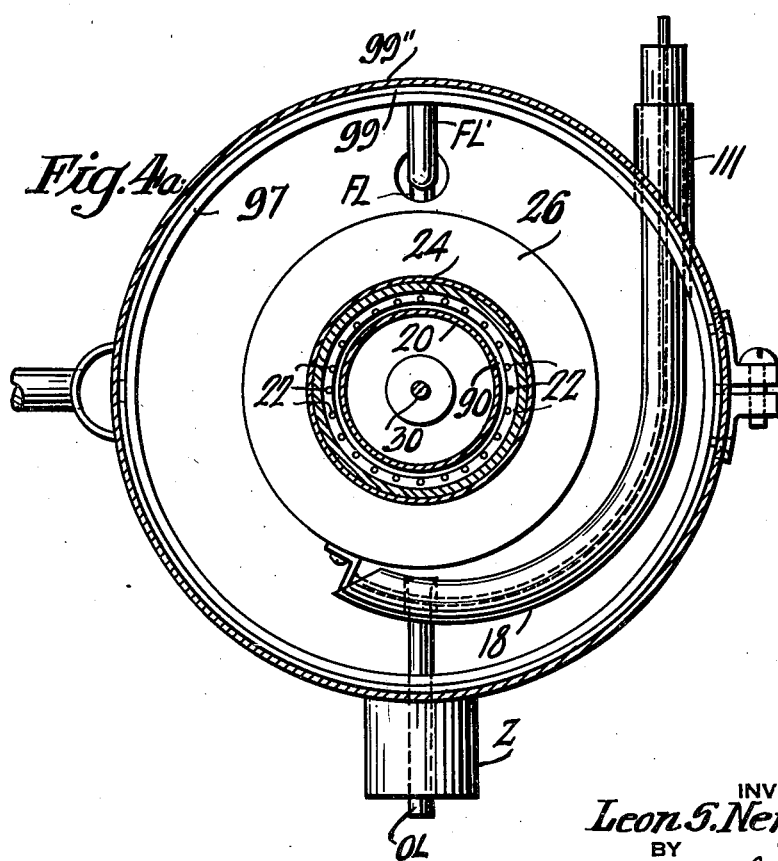

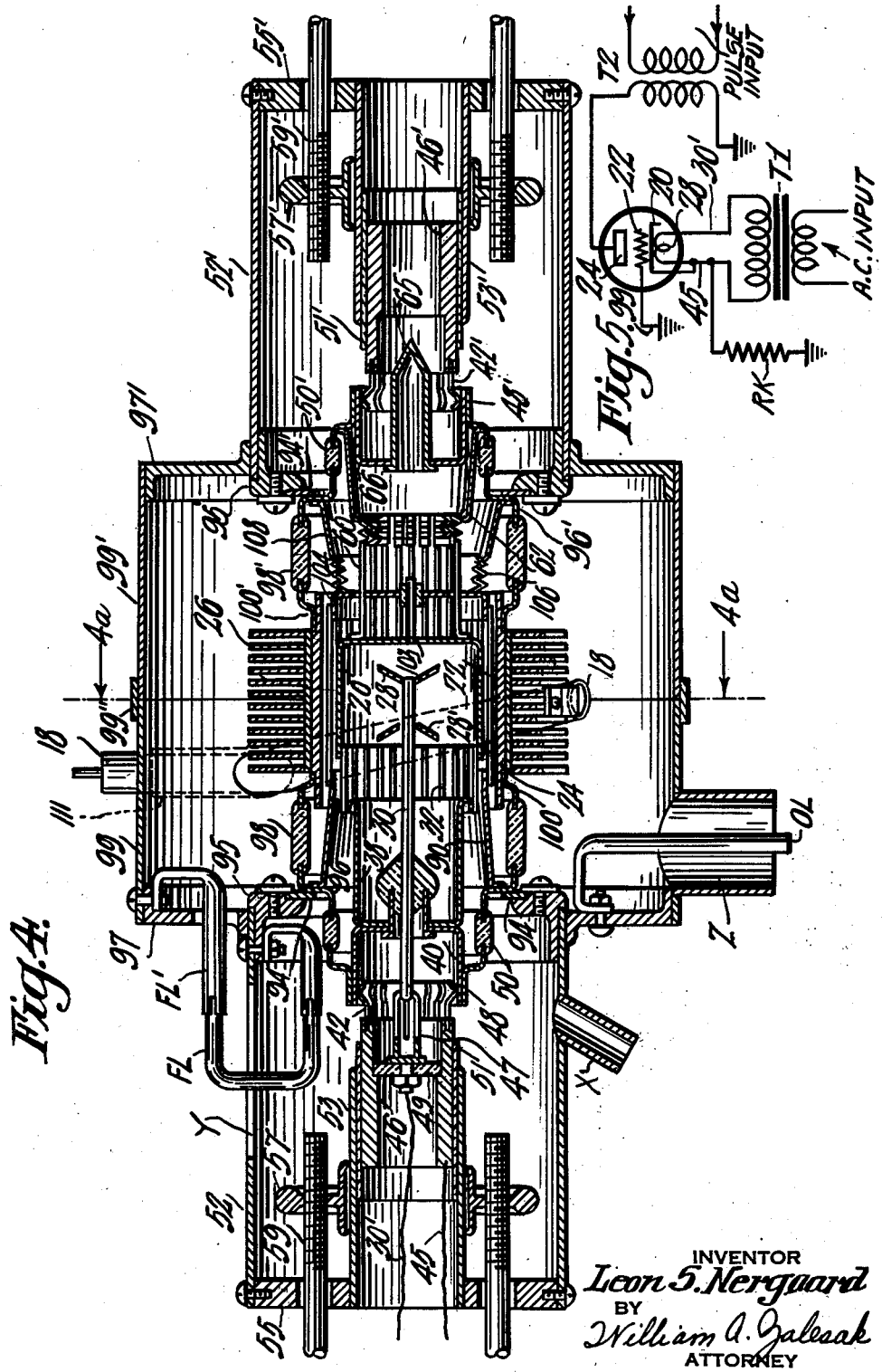

Patented Apr. 8, 1952

2,591,963

UNITED STATES PATENT OFFICE 2,591,963

ELECTRON DISCHARGE DEVICE AND CIRCUIT

Leon S. Nergaard, Princeton, N. J., assignor to Radio Corporation of America, a corporation of Delaware Application June 17, 1948, Serial No. 33,651

15 Claims. (Cl. 315—5)

In this application, I disclose an improved electron discharge device and circuit useful for generating high power of high frequency. For example, the device of my invention is capable of generating about 200 kilowatts of power at a frequency of around 1000 megacycles per second or higher. The electron discharge device of my invention is of use throughout the electronic and allied arts.

In devices for generating high frequency energy known heretofore, the circuits take the form of lines or the like and there is a tendency of the devices and circuits to operate at two or more modes with different frequencies. For example, in these generators, oscillation may start in one mode at a particular frequency but after the tube becomes warm and for other reasons causing instability, the tube and circuits may operate in a second mode and at a different frequency. This mode switching limits the usefulness of the device and circuit and the primary object of my invention is to provide a novel electron discharge device in a novel circuit connection which has but one possible mode of operation.

In electron discharge devices operating in high-frequency high-power circuits of the resonant line or like type known in the art, blocking capacitors are necessary to keep the plate voltages from the grid electrode and to permit application of bias to the grid electrodes with respect to the cathode. The capacitors are in the generating circuits and where control modulation by pulses or the like energy is to be applied, the control circuit output is loaded by the said capacitors to place a direct limitation on the width of the band of modulation frequencies that can be used and otherwise introduce distortion. In particular is this true of the high direct current blocking capacitors in the anode-grid alternating current circuits because these capacitors must be large enough to offer negligible impedances to the high frequency currents and must embody good insulation to stand the high direct current voltages involved. The manner in which distortion is caused by the capacitance loading will be understood if it is assumed that pulses of high-frequency energy of square-wave form are to be generated. Then an electrode potential is varied by voltages of square wave form. The blocking capacitors operate as filters to round off the leading edges of the generated pulses thereby distorting the signal. The result is substantially the same but not so pronounced where blocking capacitors are used in the grid-cathode resonant circuits and the modulation is applied to the grid.

It is a further object of my invention to provide an electron discharge device and circuit so arranged that the need of blocking capacitors in the grid plate or grid-cathode alternating current circuits or both are unnecessary. Thus the capacitance load into which the modulator or control stage works is reduced comprising mainly only the internal electrode capacity. Thus the operation of the electron discharge device and circuit is improved.

Attainment of the last object entails also the provision of a novel arrangement of the plate direct current supply connections to the anode.

In order to make use of the large amount of technical electron discharge device information at hand and to get the required power output, my improvements are described as being applied to an electron discharge device having an oxide coated cathode of cylindrical shape and considerable axial length with appropriate control and anode electrode structures associated with the said anode. When operation at the frequency range mentioned above is contemplated, and it is here, the cathode length, per se, is a substantial portion of a quarter wavelength. Hence, if the electron discharge device were to be operated with a voltage maximum at one end of the cathode, the other end of the cathode would be relatively inactive because of the resulting voltage distribution. In order to minimize the effect of this voltage distribution, it was decided to operate the electron discharge device with a voltage maximum at about the physical and electrical center of the axial extent of the cathode. To do this it was necessary to provide high frequency connections to both ends of the anode, the cathode and the grid. As a consequence, in the detailed description which follows, reference is made to a cylindrical double ended device, but it is to be understood that my improvements now to be described in detail apply equally well to devices of other type and shape.

In describing my invention in detail, reference will be made to the attached drawings wherein Figures 1, 2, 3 and 3a illustrate diagrammatically and in a large part by symbols the basic features of my invention and the manner in which the same are put to practice;

Figures 4 and 4A illustrate in cross section an embodiment of an electron discharge device and circuit arranged in accordance with my invention.

Figure 5 illustrates by basic circuit connections the manner of operating the tube and circuit of Figures 4 and 4A when it is desired to generate oscillatory energy and control the same by pulse energy to produce pulses of high frequency energy. In Figure 5 the high frequency circuits are omitted. In these figures the tube electrodes are not shown in full detail because I am not claiming the same herein.

Thus in the embodiment being described, the electron discharge device electrodes are of cylindrical form with circular symmetry and the electron discharge device is double ended with high frequency circuits and with substantial symmetry about a plane normal to the axis of the device at the longitudinal center of the electrodes to establish, when other conditions are right, a high frequency voltage maximum at the said center of the electrodes. Such an electron discharge device and circuit is shown in Figure 1. In this circuit the electrodes, capacitors, tuning pistons, feedback coupling, and the like, are shown by known symbols and are labelled and the figure as labelled taken with the curves showing the high frequency voltage distribution in the electrodes and the line circuits is self-explanatory.

In operation this circuit has an electrical length such that it is substantially three-halves wavelengths, or more between the grid and cathode curve A, and three-halves wavelength or more between the anode and grid, curve B. The three-halves wavelength in this circuit must be used because the voltage nodal points adjacent to the electrodes are within the envelope of the tube so that these nodal points are inaccessible for purposes of tuning or applying the appropriate direct current voltages to the electrodes. The circuits have discontinuities where the transmission lines approach the active elements of the tube, and the voltage distribution on the lines show these discontinuities. This oscillation circuit has several practical disadvantages where the generated oscillation are to be pulsed by controlling or modulating the potential on the tube electrode, for example, on the anode by varying potentials of square wave form.

In the first place, the anode blocking capacitors C2 must have low enough reactance so that no appreciable high frequency voltage is built up across them by the heavy alternating currents circulating in the grid anode circuit. However, when the capacitors are large enough to satisfy this requirement, they present a highly reactive load to the controlling stage or modulator output so that it is difficult to produce pulsed high frequency energy of square wave form. Furthermore, the anode blocking capacitor C2 must stand control or pulsed voltages of the order of 15,000 volts. It is very difficult to construct capacitors of adequate capacitance which will stand this voltage without excessive dielectric losses.

While the control potential, which may be direct current pulses, is generally applied to the anode in the case of tubes employing oxide-coated cathodes, it may be applied to the grid, in which case the grid capacitors C1 load the output of the tube or stage applying the pulses to the grid in a like manner although perhaps to a less extent.

The most important defect or disadvantage of an arrangement as illustrated in Figure 1 is that the electron discharge device and circuits may operate in other modes, for example, it can operate in a one-half wave mode as indicated by the dotted voltage distribution curves A' and B' of Figure 1. At the high frequency for which the circuit of Figure 1 is intended, electron transit time acts to reduce the transconductance of the tube, the more so the higher the frequency. Also circuit losses are greater the higher the frequency. Hence, the circuit oscillates more readily in the one-half wave mode than in the three-half wave mode. Practical experience has shown that such a circuit has a tendency to start oscillating in the half wave mode and then as the oscillation amplitude increases to shift to the three-half wave modes. This, of course, reduces the usefulness of the system and is a very undesirable characteristic.

It is possible to reduce this tendency to switch modes by making one circuit, say the grid-anode circuit, a three-halves wave circuit as illustrated by the curve B and the other circuit a five-halves wave circuit. Then the two circuits will not be in tune for the lower possible frequency and mode switching is less apt to occur. As a matter of practical experience, it is found that the tuning of the cathode-grid circuit is so broad that the expedient of using circuits in different modes by no means precludes the possibility of mode switching.

In my improved electron discharge device and circuit, I have eliminated all the difficulties enumerated briefly above. This is accomplished in accordance with my invention as follows. To avoid pointless mechanical considerations, for the moment disregard the grid-cathode circuit. Then it would be possible to cut off the grid conductors a quarter-wave from each end. This would result in a circuit and voltage distribution such as shown at C in Figure 2. It is observed that the high frequency voltages between points 1 and 1' and between points 2 and 2' are equal and in phase. Hence, the point 1 may be connected to point 2 and the point 1' to the point 2' without altering the voltage distribution. Geometrically, this may be accomplished as shown in Figure 3. The details are: (1) The cylindrical anode connections P—P are connected by a cylinder 10. This effectively ties points 1 and 2 together. (2) The cylindrical grid connections G—G are extended radially by flanges 12 and 14. These flanges are tied together at their peripheries by a cylinder 16. This effectively ties the points 1' and 2' together. Obviously, the cylinder 10 may be omitted and the radiator of the tube itself will serve to make connection 1, 2, which in practice need not be continuous.

Figure 2:
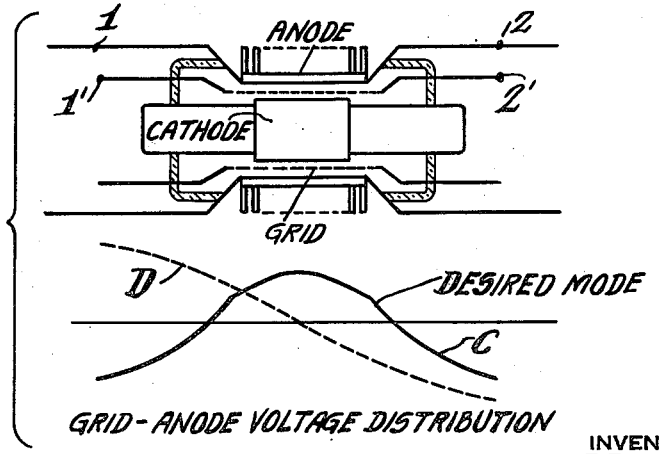

Whereas the circuit shown in Figure 2 will support the half-wave mode shown as a dotted distribution curve D in Figure 2, the circuit of Figure 3 will not support this mode. This may be seen from the following consideration: It was possible to construct the circuit of Figure 3 from the circuit of Figure 2 because the voltages with respect to radio frequency ground at the points of the circuit which are to be tied together are equal and in phase as described above. However, for the half-wave mode illustrated as the dotted curve D in Figure 2, the voltages between 1 and 1' and between 2 and 2', while equal in magnitude, are 180° out of phase. Because it is impossible for two different and distinct voltages to coexist between the same pair of points, it is not possible to tie point 1 to point 2 and point 1' to point 2' in Figure 2 and maintain the voltage distribution D except in the trivial case where the voltage is everywhere zero. Therefore, the full-wave mode is the lowest frequency, or fundamental, mode of the circuit. Hence, this circuit will show no tendency towards mode switching.

In the foregoing discussion, the grid cathode circuit was disregarded. In practice, the grid and cathode may be included in a resonant circuit such as a line or waveguide or cavity resonator.

Moreover, the line may have a total length of $3/2$ N as illustrated in Figure 1. Furthermore, this voltage distribution may be as in Figure 1. The arrangement then is as shown by dotted lines at GC in Figure 3. In practice, the grid lead is a cylinder like the outer member of a coaxial line and the cathode is a cylindrical lead within the outer line. The use of a three-halves wavelength circuit including the cathode and grid entails no possibility of mode switching to a lower frequency mode when the grid-anode circuit operates in its fundamental mode. If the oscillator were to tend to oscillate in the fundamental mode of the cathode-grid circuit, the grid-anode circuit impedance would be too low for the tube to amplify and oscillation could not occur.

A second feature of this circuit is that it requires no anode blocking capacitor because there is no direct current connection between the anode and grid. To feed direct current to the anode, a lead 18 is arranged in a spiral in the plane 3—3'. This lead extends from the point e on the radiator of the tube through the outer cylinder 16 at point f. In practice, to facilitate installation of the tube in the circuit, the lead 18 may be arranged as described in a plane not quite normal to the tube axis. Then it is connected to a point between the ends of the radiator but advances longitudinally as it spirals outwardly. Then even if the magnetic field has some strength its effect on one part of the lead is cancelled by its effect on the other part of the lead. It is important however that this lead be kept in a plane where the magnetic flux linkage is at a minimum. It may be shown that if the length of lead from e to f is a half wavelength, and connections are made at e and f, the lead will present an infinite impedance between the points e and f. In practice, it was not possible to connect the lead to point f because the lead must supply the plate current of the tube at a very high voltage of the order of 15,000 volts. By experiment, it was found that if the lead passed through a metallic bushing soldered into the cylinder at point f so that a small amount of capacitance was introduced between the cylinder and lead, and if the lead were adjusted to about ⅝ wavelength, it presented very high impedance to the anode and little radio frequency leakage occurred.

In Figures 4 and 4A, I have illustrated application of my invention to one embodiment of a double ended electron discharge device having an anode and a cathode of cylindrical form and considerable axial length. Figure 4 is a cross section through the axis of the electron discharge device. Figure 4A is a section on the line 4a—4a, Figure 4. These figures illustrate the circuit arrangement and its association with the tube electrodes and the manner of applying direct current potential to the tube anode.

In the said figures, 20 is the cylindrical cathode surrounded by the cylindrical grid 22 in turn surrounded by the cylindrical anode 24. These electrodes and their arrangement are shown substantially as used in a tube but are not drawn to scale nor shown in full detail. The anode has cooling means in the form of a radiator 26 associated therewith. The radiator 26 with the anode 24 and its mounting forms the inner wall of a double-walled cavity resonator as discussed hereinafter. The tube electrodes are double ended. The cathode 20 is indirectly heated by heater elements not shown in detail but connected between flange 28 mechanically and conductively connected to the heater rod-like lead 30 and flange 28' insulated from the rod 30 and conductively connected to cathode support members as will appear hereinafter. Details of these parts and connections are omitted for the sake of brevity and in order to permit clearer illustration of other features. A similar cathode heater arrangement in a single ended tube is shown in R. R. Law's U. S. Patent No. 2,456,714, issued December 21, 1948. The heating current is supplied by rod 30, lead 30' and lead 45 connected to the member 28' insulated from the rod 30. Lead 45 also is the direct current cathode connection. The cathode 20 is mounted at one end on cathode support tabs 32 fastened to a cathode support cup 38 in turn fastened to a cathode end cup 40. The end cup 40 slides over resilient contact members 42 fastened to or integral with the member 46. A flanged cup-like member 48 soldered to or integral with the cathode end cup 40 provides a cathode lead connection including members 42, 46 and lead 45. The member 48 is made of Kovar in order that it may be fastened by a glass ring 50 to the grid and plate support ring 90 as will be described more in detail hereinafter to support the cathode and to provide insulation between the cathode and the grid and plate electrodes.

The other end of the cathode 20 is connected by a plurality of flexible cathode leads 60 to a cathode connecting cone 62 which is soldered or otherwise bonded to a member 48', similar to the member 48, in that it provides a connection to the cathode and a means of connecting this end of the cathode structure through the glass ring 50' to the grid and anode supports. A cathode end cup 66 carrying the exhaust tubulation 65 and otherwise similar to the end cup 40 is soldered or otherwise bonded to the member 48'. Resilient metallic fingers 42', on a member 46', similar to the member 46, slide into the cup member 66 to make connection to the cathode at this end of the tube.

The grid 22 is mounted at the left end on a grid support cone 90 being soldered thereto or integral therewith. The cylindrical cone 90 is fastened to the ring member 96 by soldering or otherwise. This ring member 96 is fastened to the member 94 in turn fastened to ring 95. The member 96 is of Kovar and is bonded at one end to the glass ring 50 and at the other end to the glass ring 98 which in turn is bonded to a Kovar offset ring member 100 to which the anode 24 is fastened. The other end of the grid 22 is integral with or bonded to a grid cap 104. The grid is centered with respect to the cathode by a pin 103 mounted on the cathode and carrying an insulating bushing. The grid cap 104 has welded thereto a plurality of flexible grid leads 106 connected between cap 104 and the grid connecting cone 108. The grid connecting cone 108 is soldered to an offset ring like member 96' similar in shape and purpose to the member 96. This member is of Kovar and is bonded at one end to the glass ring 50' and at the other end to a glass ring 98' whose arrangement and purpose is similar to that of the glass ring 98. The metallic rings 96 and 96' are conductively connected by rings 94 and 94' and 95 and 95' to the outer casings 52 and 52' forming the outer conductors of the grid cathode line of the radio frequency circuit to be described hereinafter.

The glass ring 98' is also bonded to a Kovar offset ring member 100' which in arrangement and purpose is similar to the ring 100. The anode 24 is fastened adjacent its ends to the rings 100 and 100' to be mounted coaxial with the grid which as mounted is in turn coaxial with the cathode. Note that the anode 24 extends considerably beyond the grid at each end to prevent electrons from striking the glass members 98 and 98'.

The tuning circuit for the tube and its electrodes will now be described. The resilient members 42, as stated above, are fastened to the cathode contact cylinder 46. The heater rod 30 slips into the end of a sleeve-like connector or contact 47 mounted in an insulating support 49. The cathode contact cylinder 46 is covered by a mica ring 51 which insulates the member 46 from the inner cathode conductor 53, the members 46, 51 and 53 comprising a cathode blocking capacitor. The member 53 with its connections as described forms the inner member of a coaxial line comprising conductors 52 and 53. The line is tuned by means of a capacitor comprising the torus shaped member 57 and the member 52. The effective capacitance is varied by sliding the member 57 axially by means of the threaded insulating rods 59 mounted in an end plate 55 which also terminates the line. It is noted that these members are outside the evacuated electrode container. The outer member 52 of this line is in the form of a cylinder, slotted and provided with apertures where necessary. For example, it is apertured at X in order that a cooling medium may enter and leave an opening not shown. The slot at Y accommodates the feedback loops FL and FL'. The cylinder 52 is bonded at one end to the member 55 and at the other end to the main support member 95 to which electrodes are fastened and by which the electrodes are supported. This outer member 52 is conductively connected by 95 and 94 to the grid cone support 90 and with the cylindrical grid, its support 90, etc., forms the outer member of the coaxial line having as an inner member the element 53, its coupling to 46, 46, 42, 40, 38, 32 and the cathode. A similar line is formed at the other end of the tube electrodes and because of the similarity between the two connections they will not be described in detail. This line includes 52', 95', 94', 106, 104 and grid 22 as an outer member and members 53', its coupling to 46', 46', 42', 48', 62, 60 and cathode 20. Corresponding numerals have been applied to like tube and circuit elements insofar as possible with those at the right end of the tube primed. The complete coaxial line extending from 55 to 55' inclusive has a length such as to be electrically equivalent to three-halves wavelengths of the oscillations generated. Since the ends of the line members are shorted at 55 and 55', voltage minimums appear at the ends, while as pointed out above in connection with Figure 3, the potential distribution is such that a potential maximum appears intermediate the ends of the grid and cathode.

The grid anode resonate cavity comprises end flanges 97 and 97' integral with or bonded to the cylinders 52 and 52' where they are joined to rings 95 and 95' and two cylindrical like members 99 and 99' bolted to the outer periphery of flanges 97 and 97'. The cylinders 99 and 99' may be replaced by a single cylinder but to simplify installation of the tube in the circuit, two pieces are used and joined by a ring 99''. An aperture is provided in one of the cylindrical members as at Z to permit coupling an output loop OL into the cavity.

The anode electrode 24 forms, as stated above, a part of the inner wall of a double-walled cavity resonator, the outer wall of which is formed by the grid electrode, members 90, 96, 94, 95 and an end flange 97, cylinders 99 and 99' and flange 97', flange 97', rings 95' and 94', grid connecting cone 108, flexible leads 106 and grid end cap 104.

The inner cavity wall comprises the anode 24 and its extensions, the outer surfaces of the Kovar rings 100 and 100' and the outer surfaces of the anode radiator 26. 97, 97', etc. of Figure 4 then replaces elements 12 and 14 of Figure 3. 99, 99', etc. of Figure 4 then is represented by 16 of Figure 3 and P and 10 of Figure 3 correspond to the radiator 26 for the anode 24 in Figure 4.

The electrical length of the anode-grid resonator, from the central plane of the grid-anode space around the resonator and back to said central plane, is substantially N times the operating wavelength of the device, where N is a whole number. In terms of high frequency current paths, the electrical length of each of the two paths along the inner and outer walls of the resonator, between the mid-points of the grid 22 and anode 24, is substantially N times the operating wavelength. This is possible with the different geometrical lengths shown in the drawing because the propagation constants along the inner and outer walls of the resonator are different.

The means for applying voltage to the anode is illustrated in Figures 4 and 4A and comprises the insulated lead 18 strapped at one end to the anode radiator 26, spiralling outwardly in a novel manner and passing through a metal sleeve 111 fastened in the member 99. In order to prevent coupling between the cavity and the lead, the lead is arranged to lie in a surface as nearly normal to the axis of the tube as permitted by mechanical considerations. Thus the lead lies in a region of minimum magnetic field and has a minimum of flux linkage with this field in accordance with the invention. Moreover, the lead is of such length that, taking account of the small capacitance between the lead and the sleeve 111, it is effectively a half-wavelength in length and acts as an open circuit between the radiator 26 and the member 99.

The electron discharge device of my invention may be used in radio circuits as desired to operate as a generator or as a pulsed or otherwise modulated generator. Then the low frequency and direct current connections may be as illustrated in Figure 5. The control grid being conductively connected to the large cylinders 99 and 99' conveniently operates at ground direct current potential. This has the advantage that output coupling comprising the coaxial structure Z, OL may be connected directly to a coaxial output line without intermediary insulation. The cathode lead 45 may include a resistor RK to hold the cathode positive relative to ground. The lead 45 and 30' supply filament heating currents from transformer T1. Pulse anode voltage is provided through the transformer T2.

I claim:

1. An electron discharge device having two elongated telescoped coaxial cylindrical electrodes and a high frequency circuit for said device including conducting means forming continuations of said cylindrical electrodes extending from both ends of each electrode and turning outwardly and back to meet each other, the conducting means extending from the ends of the inner cylindrical electrode surrounding and spaced from the conducting means extending from the ends of the outer cylindrical electrode, whereby said continuations form with said electrodes a high frequency cavity resonator, the electrical length of said resonator being substantially N times the wavelength at which the device is to operate where N is a whole number.

2. An electron discharge device having elongated electrodes including a cathode, a grid and an anode mounted in an evacuated container in the order given and a high frequency circuit for said electrodes including high frequency conductors in the form of continuations from both ends of the anode and grid which turn outwardly and back, said continuations from the ends of said grid meeting each other and said continuations from the ends of said anode meeting each other, to form with the tube electrodes closed paths one within the other and providing the boundaries of a cavity resonator, the normal frequency of operation of which corresponds to the wavelength at which the electron discharge device is to operate.

3. An electron discharge device having within an evacuated container two elongated electrodes with active areas, and a high frequency circuit for said device including high frequency conductors extending from both ends of the electrodes and bending outwardly from the electrodes in the same direction and turning back to meet each other and form with each electrode a closed high frequency path, the conductors extending from the ends of one of said electrodes meeting at a point spaced a substantial distance outwardly of the other of said electrodes, one path being within the other, said paths forming a resonant circuit, the electrical length of which is substantially N times the wavelength at which the device is to operate where N is a whole number.

4. An electron discharge device having electrodes comprising a cylindrical cathode, a cylindrical grid, and a cylindrical anode mounted in the order given about a common axis, a high frequency circuit for said electrodes comprising continuations of the cylindrical electrodes extending from each end thereof and flaring outward and back along the said axis to meet, and a lead connected to said anode and spiralling outwardly and passing through said outer turned-back continuation, said lead being of a length substantially equal to a half wavelength as determined by said high frequency circuit.

5. An electron discharge device and circuit comprising telescoped cylindrical cathode, control electrode and anode structures, a tuned circuit therefor including cylindrical like continuations of both ends of the control electrode and anode which turn outwardly and back to meet and form a cavity resonator bounded on its inner periphery by said anode and its continuation and on its outer periphery by said control electrode and its continuation, and a lead connected to the anode and extending outwardly and through the continuation of said control electrode.

6. An electron discharge device having electrodes including an anode and a control grid each in the form of a cylinder, the cylinders being telescoped and coaxial, an electrical circuit for said tube including high frequency conductors, which are a continuation of said grid, extending in each direction from the ends of the grid and turning back to meet in a plane normal to the axis of the cylinder which plane substantially bisects the electrodes, a lead having an electrical length equivalent to ½ the wavelength at which the device operates, connected to said anode near its point of intersection with said plane and extending through said outer conductor near its point of intersection with said plane, there being material capacitance formed between said lead and said outer conductor at the point where it passes through the outer conductor.

7. An oscillation generator operable at a single frequency comprising an electron discharge device including a cathode and control electrode and anode, a cavity resonator including said cathode and control electrode and having an electrical length equal substantially to 3/2 of the desired operating wavelength, a second resonant circuit including said anode and said control electrode and tuned to the desired operating wavelength, and an output line coupled to one of said resonators.

8. An ultra-high frequency oscillation generator including an electron discharge device having double ended cylindrical electrodes including an anode and a control electrode, and a cavity resonator including as its boundaries said control electrode, an enclosing cylinder for said electrodes and spaced a substantial distance from said anode, end plates joining corresponding ends of said enclosing cylinder and said control electrode, and said cylindrical anode.

9. An electron discharge device having double ended electrodes including an anode, a cathode and a control grid, an alternating current circuit for the grid and cathode including line like extensions from both ends thereof, the total length of said circuit being equal to 3/2 of a wavelength corresponding to a predetermined operating frequency, and an alternating current circuit for the grid and anode including line like extensions from both ends thereof the total length of said second mentioned circuit being equal to said wavelength corresponding to said operating frequency.

10. An electron discharge device having electrodes including an anode and a grid and a hollow conducting means connected to said grid and enclosing said anode, said hollow conducting means being spaced a substantial distance from said anode at all points, the grid-anode space and the space between said anode and said hollow conducting means forming a continuous passage which is resonant to the desired operating frequency of the device.

11. An electron discharge device having electrodes including an anode, a control grid and a cathode of which electrodes, the cathode and grid at least are double ended, a cavity resonator surrounding said anode and adapted to operate at a predetermined frequency, said grid forming a part of the wall of said resonator, oppositely disposed resonators positioned on opposite sides of the first cavity resonator adapted to operate at said frequency, and a coupling between each of said last named resonators and the grid and cathode of said device.

12. An electron discharge device comprising a double ended cylindrical grid and conducting means turning outwardly from both ends of said grid and back to form with the grid a hollow chamber, and an anode electrode electrically floating in said chamber and spaced a substantial distance at all points thereof from the walls of said chamber, the grid-anode space and the space between said anode and said conducting means forming a continuous passage which is resonant at the desired operating frequency of the device.

13. An electron discharge device having double ended electrodes including an anode, a control grid and a cathode, a cavity resonator adapted to operate at a predetermined frequency corresponding to the fundamental operating mode of the cavity resonator, said anode being within said resonator and spaced a substantial distance from the walls thereof, said grid forming a portion of the wall of said resonator, and a second cavity resonator coupled between said cathode and grid and adapted to be operated at said frequency in a higher mode.

14. An electron discharge device having an anode and a grid, a hollow conducting member comprising said anode, said grid forming a part of a wall of said hollow member and forming therewith a resonator, means for applying potential to said anode including a lead extending into said resonator and having an electrical length equal to a half wavelength of the fundamental frequency of the resonator and a capacity coupling between said lead and the outside wall of the resonator.

15. An electron discharge device having coaxial cathode, grid and anode electrodes, a hollow conductive member surrounding and coaxial with said electrodes and coupled to the ends of said grid and enclosing said anode and forming with said grid a cavity resonator, said hollow member being spaced a substantial distance from said anode, and cavity resonators coupled between the opposite ends of said cathode and grid electrodes.

LEON S. NERGAARD.

REFERENCES CITED

The following references are of record in the file of this patent:

UNITED STATES PATENTS

| Number | Name | Date |
|---|---|---|
| 2,128,231 | Dallenbach | Aug. 30, 1938 |
| 2,128,235 | Dallenbach | Aug. 30, 1938 |
| 2,128,232 | Dallenbach | Aug. 30, 1938 |
| 2,141,080 | Dallenbach | Dec. 20, 1938 |
| 2,157,952 | Dallenbach | May 9, 1939 |
| 2,167,201 | Dallenbach | July 25, 1939 |
| 2,216,169 | George et al. | Oct. 1, 1940 |
| 2,259,690 | Hansen et al. | Oct. 21, 1941 |
| 2,442,662 | Peterson | June 1, 1948 |
| 2,501,095 | Record | Mar. 21, 1950 |